US006371353B1

(12) United States Patent
Ikeda et al.

(10) Patent No.: US 6,371,353 B1
(45) Date of Patent: Apr. 16, 2002

(54) PRESSURE WELDING APPARATUS AND PRESSURE WELDING METHOD

(75) Inventors: Yuji Ikeda, Yokohama; Koji Imai, Kawasaki; Shigeru Isohata, Tokyo; Shinji Amemiya, Yokohama, all of (JP)

(73) Assignee: Tyco Electronics, Amp, Ltd. (JP)

( * ) Notice: Subject to any disclaimer, the term of this patent is extended or adjusted under 35 U.S.C. 154(b) by 0 days.

(21) Appl. No.: 09/525,239

(22) Filed: Mar. 15, 2000

(51) Int. Cl.[7] ................................................ B23K 37/00

(52) U.S. Cl. .................... 228/5.5; 228/262.51; 228/3.1; 228/4.1

(58) Field of Search ............................ 228/5.5, 262.51, 228/3.1, 4.1

(56) References Cited

U.S. PATENT DOCUMENTS

| | | | | |
|---|---|---|---|---|
| 5,575,061 A | | 11/1996 | Tsuji et al. | 29/863 |
| 6,135,827 A | | 10/2000 | Okabe et al. | 439/731 |
| 6,168,456 B1 | * | 1/2001 | Saka et al. | 439/404 |

FOREIGN PATENT DOCUMENTS

| | | | | |
|---|---|---|---|---|
| EP | 330366 | * | 8/1989 | H01R/43/01 |
| EP | 0 330 366 A1 | | 8/1989 | H01R/43/01 |
| FR | 2 703 520 A1 | | 10/1994 | H01R/13/514 |
| JP | 10326633 | | 12/1998 | H01R/4/24 |

* cited by examiner

*Primary Examiner*—M. Alexandra Elve

(57) ABSTRACT

A pressure welding apparatus includes a pressing die assembly 50 which has a plurality of stuffers 54 that pressure-weld electric wires 45 to the pressure-welding parts 34 of contacts 30, and a comb 70. The pressing die assembly 50 has a plurality of pins 60 which are located adjacent to the respective stuffers 54 and which are constantly driven downward by springs 62 so that the pins 60 protrude beyond the lower ends of the stuffers 54. The widths of the respective pins 60 are set so that these widths are substantially equal to the widths of the cavities 16 of the housing 10 in which the contacts 30 are accommodated. As a result, the pins 60 advance into the housing cavities 16 located adjacent to the contact 30 on which pressure-welding is to be performed, and support the housing partition walls 20 from the sides during the pressure welding process.

4 Claims, 5 Drawing Sheets

PRESSURE WELDING APPARATUS AND PRESSURE WELDING METHOD

FIELD OF THE INVENTION

The invention relates to a pressure welding apparatus and pressure welding method for pressure-welding electric wires to the pressure-welding parts of pressure-welding contacts.

PRIOR ART

Soldering, press-bonding and pressure welding, etc., have been used in the past as methods for connecting electric wires to contacts. Among these methods, pressure welding is advantageous from the standpoint of the productivity of the connecting work. Pressure welding is spreading even in the Japanese automobile industry, in which pressure welding has not been very widely used in the past. The examples shown in FIGS. 8 through 11 are universally known as examples of a pressure-welding connector for use in automobiles and a pressure welding apparatus for use with this connector (Japanese Patent Application Kokai No. 10-326633).

In FIG. 8, the pressure-welding connector 100 comprises a plurality of contacts 120, each of which has a contact part (not shown in the figures) and a pressure-welding part 122, and an insulating housing 110 which has a plurality of cavities 112 that accommodate the contacts 120. The housing 110 covers the contact parts of the contacts 120 in the front engaging part 114, but opens at the top in the rear so that the pressure-welding parts 122 of the contacts 120 are exposed. Cutouts 118 are formed in housing partition walls 116 on both sides of the cavities 112 in positions adjacent to the pressure-welding parts 122. These cutouts 118 are used to accommodate side-surface retaining parts 132 which are installed inside the pressure-welding pressing die 130 shown in FIG. 9 so that these side-surface retaining parts 132 are driven downward by springs 134. In order to connect the electric wires 140 and respective contacts 120, the electric wires 140 are first positioned on the pressure-welding parts 122 as shown in FIG. 10. Next, when the pressure-welding pressing die 130 is lowered, the side-surface retaining parts 132 advance into the cutouts 118, and the stuffers 136 of the pressure-welding pressing die 130 contacts the electric wires 140. Then, when the pressure-welding pressing die 130 is further lowered, the stuffers 136 press-fit (pressure-weld) the electric wires 140 inside the pressure-welding parts 122 as shown in FIG. 11. In this pressure-welding process, the side-surface retaining parts 132 that have advanced into the cutouts 118 support the side walls 124 of the pressure-welding parts 122 from the sides. Accordingly, the pressure-welding parts 122 can be prevented from opening even in cases where no contacts 120 are accommodated in the cavities 112 adjacent to the cavities 112 in which the pressure-welded contacts 120 are accommodated.

However, as the installation pitch of contacts 120 has become smaller (e.g., a pitch of 2.2 mm) with the increase in density seen in connectors in recent years, it has become unavoidably necessary to reduce the thickness of the partition walls 116 between the cavities 112. Since cutouts 118 which allow the entry of the side-surface retaining parts 132 are formed in the partition walls 116, the spatial distance between adjacent contacts 120 at the positions of the cutouts 118 is extremely small. As a result, there is a danger that electrical current flowing through the contacts 120 will leak via the cutouts 118.

SUMMARY OF THE INVENTION

Accordingly, it is an object of the invention to provide a pressure welding apparatus and pressure welding method which prevents the pressure-welding parts of the contacts from opening, without forming cutouts in the partition walls between the cavities of the connector housing.

The invention is a pressure welding apparatus for pressure welding a wire to a contact that is disposed in one cavity of a housing having a plurality of side-by-side cavities that are separated by partition walls. The pressure welding apparatus comprises a pressing die assembly having a stuffer that is associated with the one cavity, and a pair of pins disposed on respective opposite sides of the stuffer. The pins are resiliently biased to protrude beyond an end of the stuffer. The pins are arranged to enter respective cavities that are adjacent to said one cavity and to support the partition walls that are between said one cavity and said adjacent cavities.

According to one aspect, each of the pins has a width that is substantially equal to a width of its corresponding said adjacent cavity.

According to another aspect, each of the adjacent cavities holds a contact having opposite side walls, and each of the pins has a width that is substantially equal to a width between the opposite side walls.

According to a further aspect, each of the pins has a cross-sectional shape that is circular.

BRIEF DESCRIPTION OF THE DRAWINGS

The invention will now be described by way of example with reference to the accompanying drawings wherein.

DETAILED DESCRIPTION OF A PREFERRED EMBODIMENT

Figure 1:
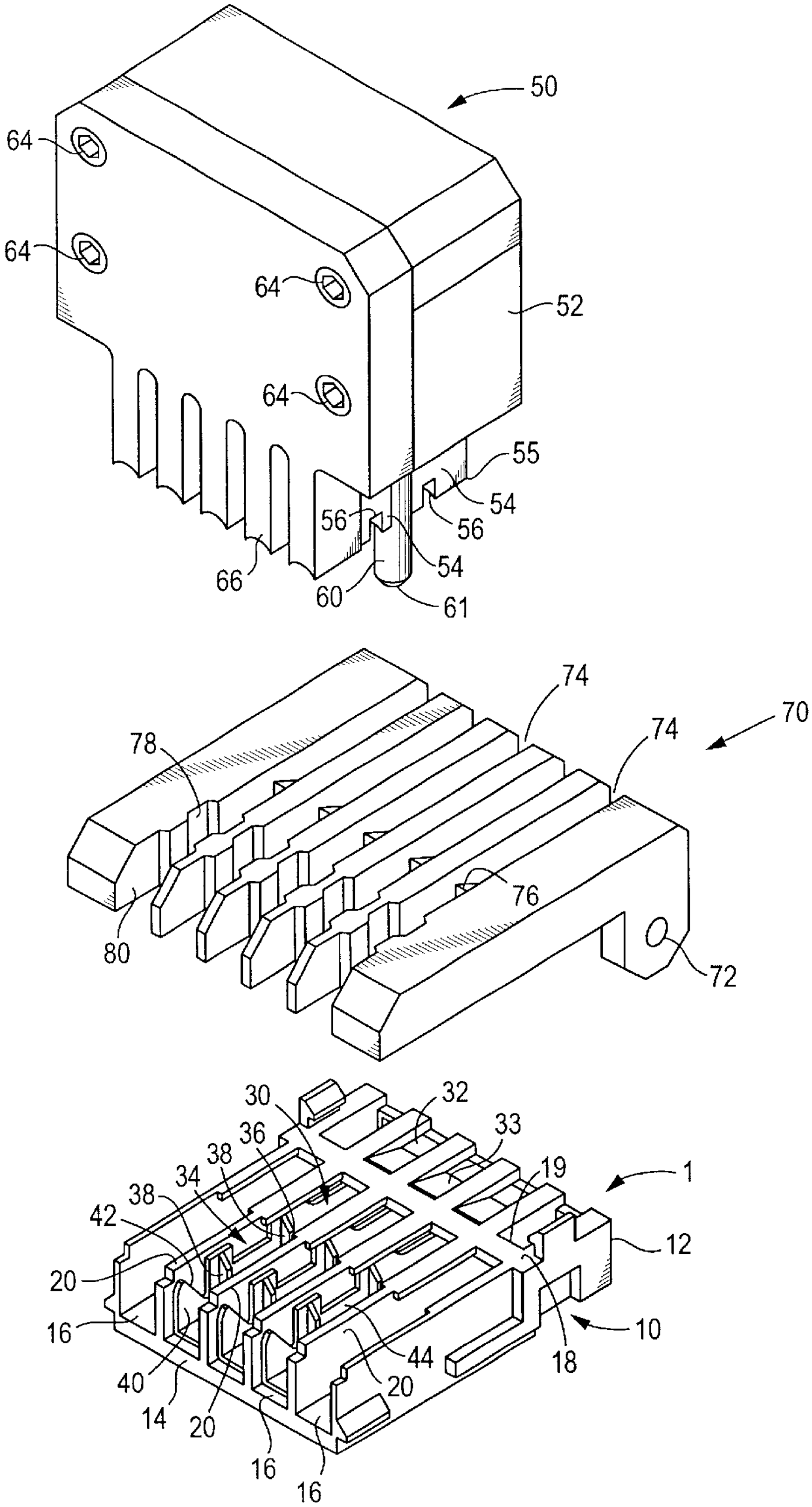
FIG. 1 is a perspective view of a pressure welding apparatus and a pressure-welding connector according to the invention.

With reference to FIG. 1, a pressure-welding connector 1 comprises an insulating housing 10 and a plurality of pressure-welding contacts 30. The insulating housing 10, which is formed by injection-molding an appropriate plastic material, has a plurality of cavities 16 that communicate between front surface 12 and rear surface 14 of the housing 10. Within each cavity 16 is a contact 30 having a contact part 32. The housing 10 has an upper wall 18 which is disposed near the front surface 12 and which covers a portion of the contact parts 32 in the respective cavities 16. Partition walls 20 are disposed on both sides of each cavity 16. The height of the partition walls 20 is selected to be higher than the highest parts of the contacts 30. As a result, leakage of electrical current between adjacent contacts 30 is prevented.

Each of the pressure-welding contacts 30 is formed by stamping and bending a conductive metal plate. Each of the contacts 30 has a substantially box-shaped contact part 32 that is adapted for making contact with a corresponding contact part of a mating connector (not shown), and a pressure-welding part 34 which is disposed to the rear of the contact part. In the present embodiment, the contact parts 32 are female type contact parts; however, these contact parts 32 may also be male type contact parts. A contact lance 33 is disposed on the upper surface of each contact part 32 and engages with an anchoring part 19 on the housing 10 to prevent the contact 30 from slipping out of the housing in the rearward direction. Each pressure-welding part 34 has two pressure-welding plates 38, 38 which are cut and raised from a bottom wall of the contact 30 and which form a U-shaped slot 36, and a pair of press-bonding barrels 40 which are disposed to the rear of the pressure-welding plates 38, 38. The press-bonding barrels 40 are formed by the extension of a pair of left and right side walls 44, 44 (see FIG. 2) that support the pressure-welding plates 38, 38 from the sides. The right side wall 44 (which is not visible in FIG. 1) has an inclined surface that extends downward toward the rear, and the left side wall 44 has an inclined surface 42 that extends downward toward the front. As a result, the left and right side walls 44, 44 of each press-bonding barrel 40 can be wrapped around the circumference of an electric wire 45 (see FIG. 2) at the time of pressure welding without overlapping each other.

Figure 2:
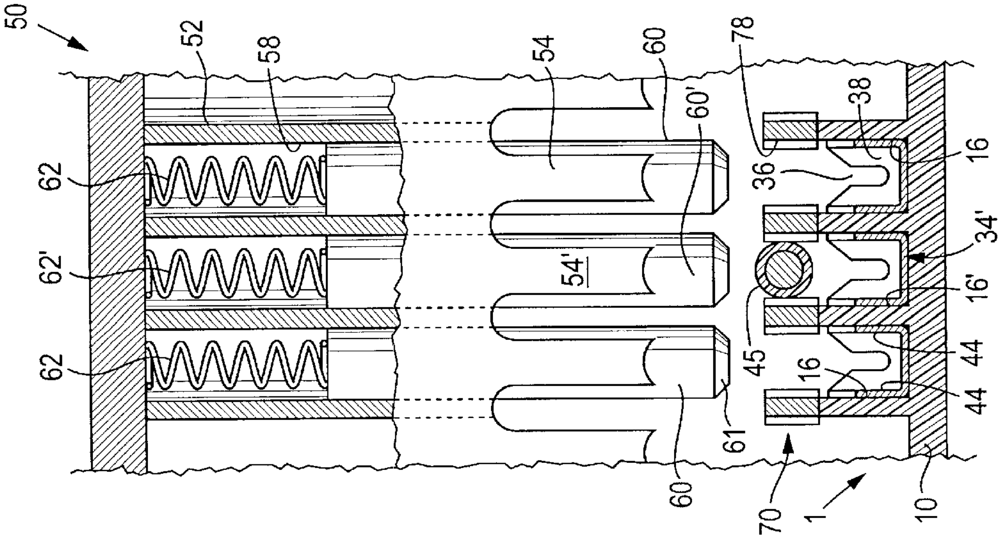
FIG. 2 is a cross-sectional view showing the pressure welding apparatus in an initial position prior to pressure welding of an electric wire in the pressure-welding connector.

In FIGS. 1 and 2, the pressure welding apparatus includes a pressing die assembly 50 and a comb 70 on a carrying stand (not shown in the figures) which carries the connector 1. The pressing die assembly 50 has a main body 52 with a plurality of integrally formed stuffers 54, 54', and a plurality of pins 60, 60' that are installed for upward and downward movement inside respective cavities 58, thus separating the respective stuffers 54. Press-bonding crimpers 66 are integrally attached to the stuffers 54 by means of screws 64. The pressing die assembly 50 is driven upward and downward by a driving device not shown in the figures. The respective stuffers 54 have recessed grooves 56, 56 that allow the pressure-welding plates 38 of the contacts 30 to escape during pressure welding. The pins 60, 60' have respective widths that are substantially equal to the widths of the cavities 16 of the housing 10, i.e., to the inside dimension between the partition walls 20, 20 that demarcate the cavities 16. In the present embodiment, the pins 60, 60' are formed with a circular cross-sectional shape so that the cavities 58 that accommodate the pins 60, 60' can easily be formed by drilling, etc., and also in order to facilitate assembly. Furthermore, the respective pins 60, 60' are resiliently biased downward by springs 62 so that the lower ends of the respective pins 60, 60' protrude beyond the lower ends of the stuffers 54.

The comb 70 is fastened to a carrying stand (not shown in the figures) such that the comb 70 can pivot about a shaft 72. This comb 70 has a plurality of grooves 74 that guide the electric wires 45 until the pressure welding process is completed. A cutting blade 76, which acts in conjunction with an edge 55 of a corresponding stuffer 54 to sever the excess length of the electric wire, is disposed approximately in the center of each groove 74. Furthermore, each of the grooves 74 has a first wide part 78 whose width is substantially equal to the diameter of the corresponding pin 60 or 60', and a second wide part 80 which accommodates the corresponding crimper 66. The first wide part 78 guides the corresponding pin 60 or 60' when the pin 60 or 60' is lowered.

Figure 3:
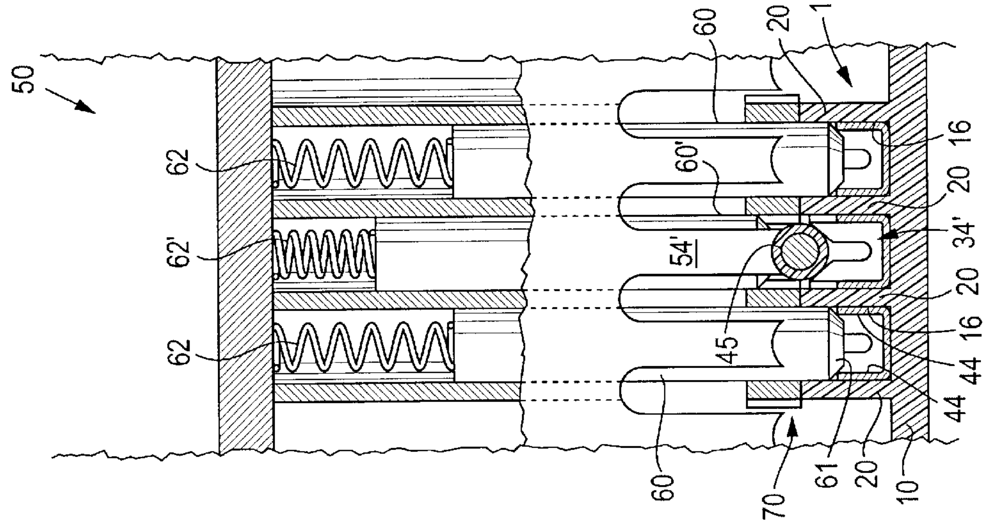
FIG. 3 is a cross-sectional view showing the pressure welding apparatus in an intermediate position during the pressure welding of the electric wire in the pressure-welding connector.

Next, a pressure welding process using a pressure welding apparatus constituting one working configuration of the present invention will be described with reference to FIGS. 2 through 4. First, the pressure-welding connector 1 is placed on the carrying stand, the comb 70 is pivoted and disposed on the connector 1, and an electric wire 45 is placed on the pressure-welding part 34' of a specified contact 30' as shown in FIG. 2. Next, the carrying stand on which the electric wire 45 is placed is caused to slide beneath the stuffer 54', and is set in place. Next, the pressing die assembly 50 is lowered by means of a driving device such as a handle, etc., (not shown in the figures). The stuffer 54' acts in conjunction with the cutting blade 76 of the comb 70 to cut the electric wire 45, after which the center pin 60' in the figure initially contacts the electric wire 45. Since a spring 62' is interposed between this pin 60' and the main body 52, the spring 62' is compressed until the lower end of the stuffer 54' contacts the wire 45, so that the position of the lower end of the pin 60' remains almost unchanged with respect to the electric wire 45 (FIG. 3). Meanwhile, the pins 60, 60 on both sides of the pin 60' advance into the adjacent cavities 16, 16 on both sides of the cavity 16' in which the electric wire 45 is disposed, so that these pins 60, 60 support the partition walls 20 of the housing 10. At the same time, tapered surfaces 61 on the tip ends of the pins 60, 60 engage with the inside edges of the side walls 44 of the pressure-welding parts 34.

Figure 4:
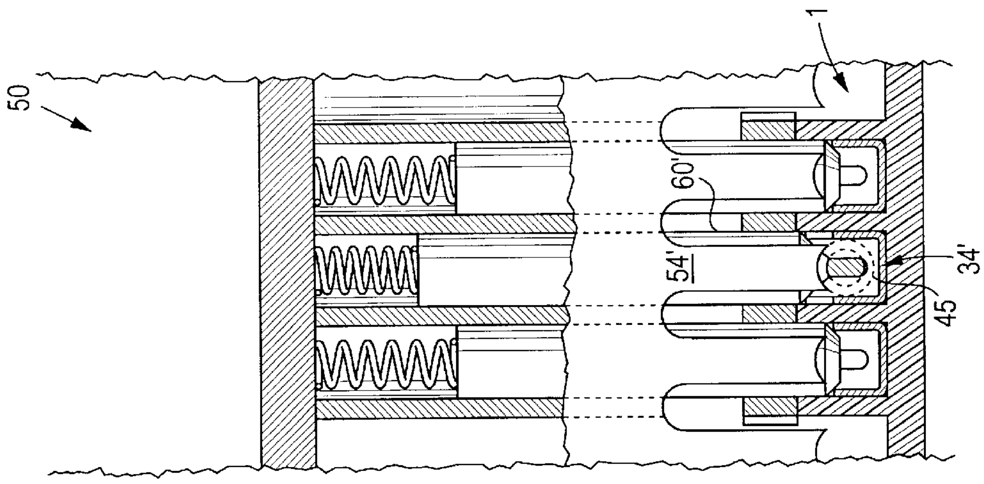
FIG. 4 is a cross-sectional view showing the pressure welding apparatus in a final position during the pressure welding of the electric wire in the pressure-welding connector.

While the partition walls 20 of the housing 10 and the side walls 44 of the pressure-welding parts 34 are supported by the pins 60, 60, the pressing die assembly 50 is lowered even further so that the center stuffer 54' press-fits the electric wire 45 in the pressure-welding part 34', thus completing the pressure welding process as shown in FIG. 4. At the same time, as a result of the lowering of the position of the electric wire 45, the position of the tip end of the center pin 60' contacting the electric wire 45 is also lowered. In the pressure welding process, the pressure-welding blades 38 are supported by the pins 60 via the partition walls 20 of the housing 10 and the side walls 44 of the contacts 30. Accordingly, a connection with the electric wire 45 can be made by means of a pressing die assembly 50 with a simple structure, without any opening in the housing 10 that exposes the pressure-welding part 34' to the outside.

Figure 7:
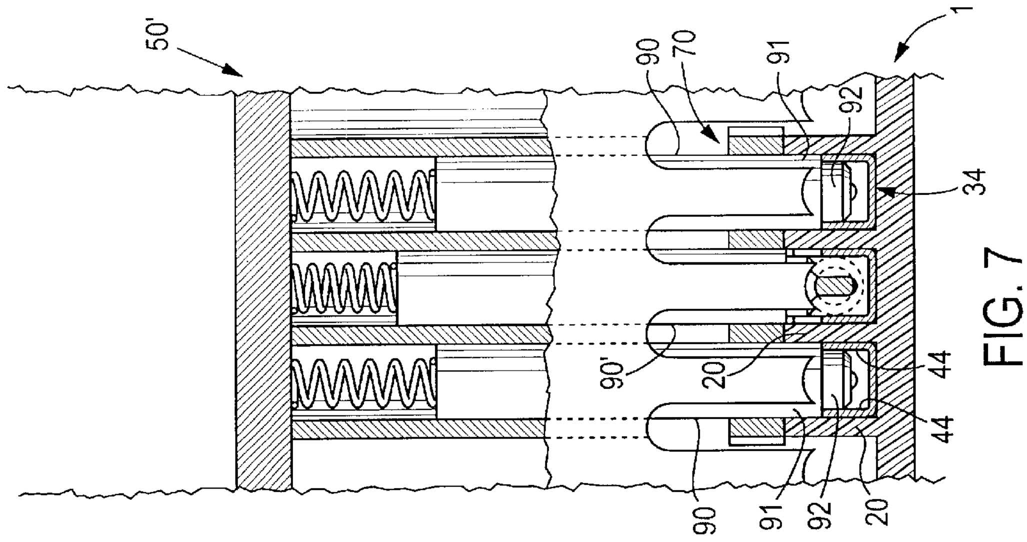
FIG. 7 is a cross-sectional view showing the pressure welding apparatus of FIG. 5 in a final position during the pressure welding of the electric wire to the pressure-welding connector.
Figure 6:
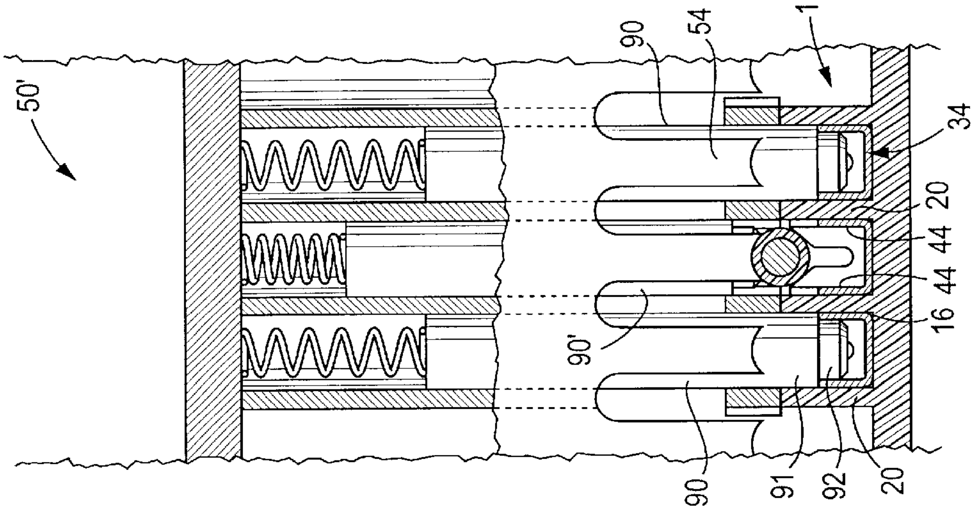
FIG. 6 is a cross-sectional view showing the pressure welding apparatus of FIG. 5 in an intermediate position during the pressure welding of the electric wire to the pressure-welding connector.
Figure 5:
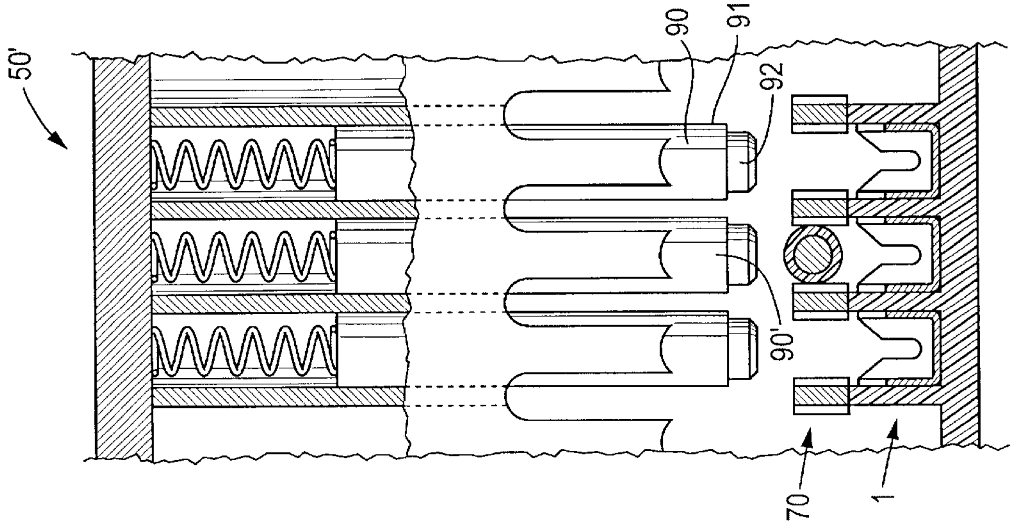
FIG. 5 is a cross-sectional view showing an alternate embodiment of the pressure welding apparatus in an initial position prior to the pressure welding of an electric wire in the pressure-welding connector.
Figure 8:
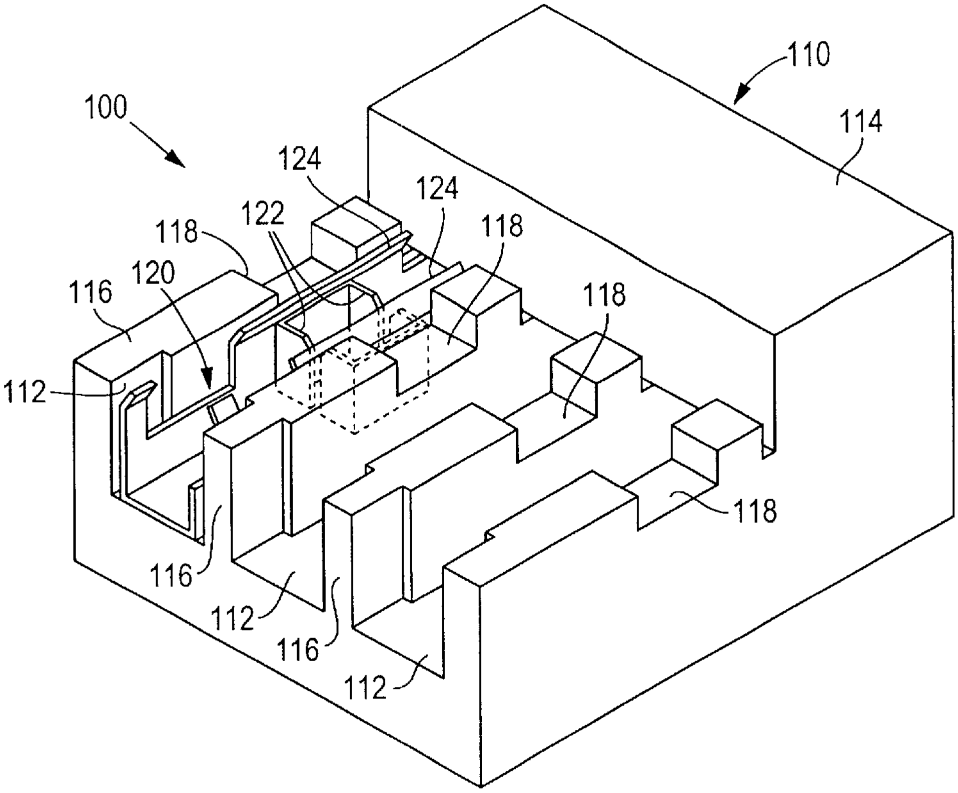
FIG. 8 PRIOR ART
FIG. 8 is a perspective view of a prior art pressure-welding connector.
Figure 9:
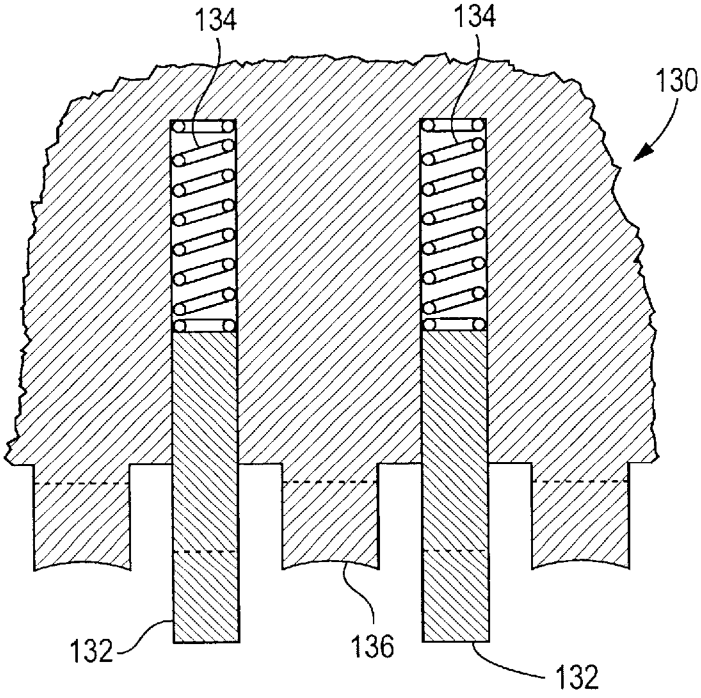
FIG. 9 PRIOR ART
FIG. 9 is a cross-sectional view of a prior art pressure-welding pressing die.
Figure 10:
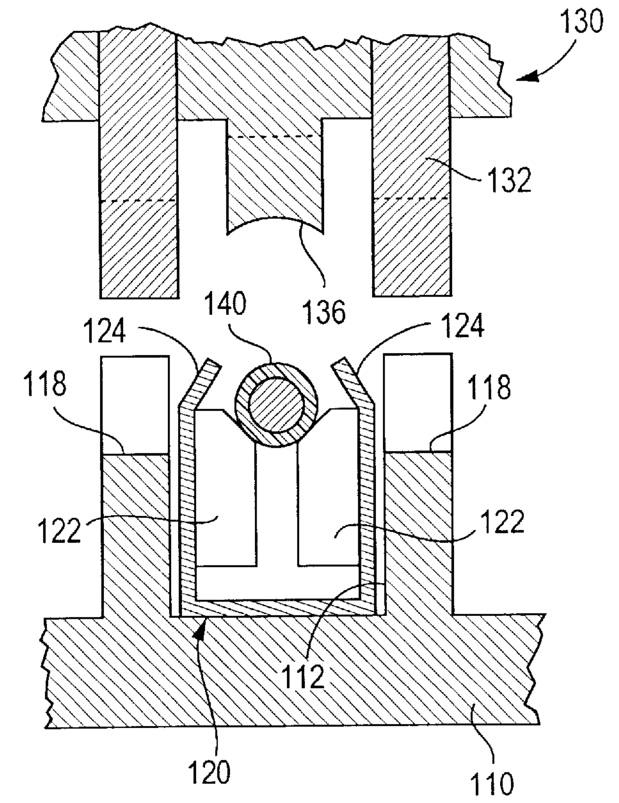
FIG. 10 PRIOR ART
FIG. 10 is a cross-sectional view of the prior art pressure-welding pressing die in an initial position prior to pressure welding of an electric wire in the prior art pressure-welding connector.
Figure 11:
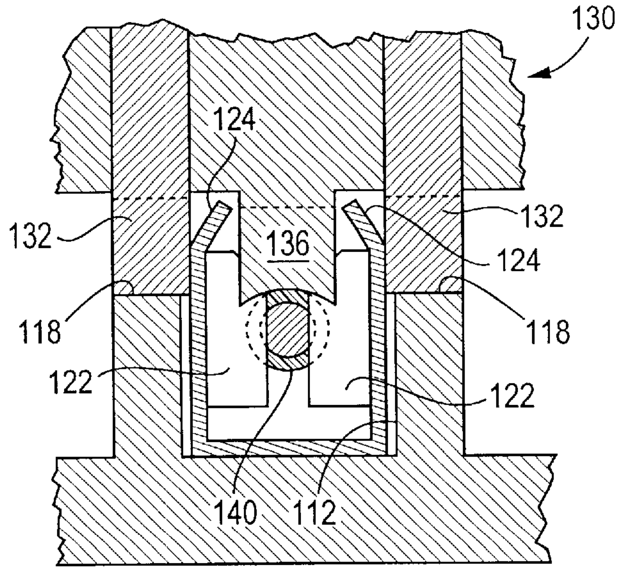
FIG. 11 PRIOR ART
FIG. 11 is a cross-sectional view of the prior art pressure-welding pressing die after pressure-welding of the electric wire in the prior art pressure-welding connector.

An alternate embodiment of the present invention will now be described with reference to FIGS. 5 through 7.

According to this embodiment, pressing die assembly 50' has pins 90, 90' each having a width that is substantially equal to the width of the cavities 16, and tip end parts 92 each having a width that is substantially equal to the inside dimension between the side walls 44, 44 of the contact pressure-welding parts 34. When the pressing die assembly 50' is lowered, large-diameter parts 91 of the pins 90 support the partition walls 20 of the housing 10, and the tip end parts 92 support the inside surfaces of the side walls 44 of the contact pressure-welding parts 34 as shown in FIGS. 6 and 7. As a result, support is added to the side walls 44 of the contact pressure-welding parts 34, thereby strengthening the support of the partition walls 20 of the housing.

A preferred embodiment of the present invention was described above. However, the present invention is not limited by the above-described embodiment; various modifications and alterations may be made as required. For example, the cross-sectional shape of the pins 60, 60', 90, 90' has been described as circular; however, the cross-sectional shape could also be rectangular. In such a case, the contact area with the partition walls 20 of the housing 10 would be increased, so the effect of the pins in supporting the partition walls 20 is enhanced. Furthermore, in the above-described embodiment, the pins 60, 60' supported the partition walls 20, 20 as a result of having a width substantially equal to the width of the cavities 16 of the housing 10. However, it would also be possible for the pins 60, 60' to have a width substantially equal to the inside dimension between the side walls 44, 44 of the contact pressure-welding parts 34. In such a case, the housing partition walls 20 would be supported via the side walls 44 of the contact pressure-welding parts 34. Furthermore, it is not necessary that the comb be attached to the carrying stand so that the comb is free to pivot; for example, it would also be possible in an automatic pressure welding machine, etc., to arrange the system so that the comb advances onto the pressure-welding connector beneath the stuffers prior to the pressure welding process. Moreover, in the above-described embodiments, a so-called one-shot state was illustrated in which a single electric wire is pressure-welded. However, it would also be possible to pressure-weld a plurality of electric wires simultaneously, or to install only a single stuffer.

In the pressure welding apparatus of the present invention, the pressing die assembly has a plurality of pins which are located adjacent to the respective stuffers, and which are resiliently biased downward so that they protrude beyond the lower ends of the stuffers. Furthermore, the widths of these pins are set so that they are substantially equal to the widths of the housing cavities in which the contacts are accommodated. Accordingly, the pressure welding apparatus of the present invention is advantageous in that the opening of the pressure-welding parts of the contacts can be securely prevented without forming cutouts in the partition walls between the cavities of the connector housing. Furthermore, since the pressing die assembly has a simple structure, the manufacture of this assembly is also facilitated.

Furthermore, the invention encompasses a pressure welding method in which electric wires are placed in the pressure-welding parts of contacts accommodated in specified cavities of a connector housing. The method utilizes pins which are installed in a pressing die assembly and are constantly driven downward so that they protrude beyond the lower ends of stuffers and advance into the interiors of cavities adjacent to the specified cavities. The pins support the partition walls of said cavities or the side walls of the contact pressure-welding parts inside said cavities. According to this method, the stuffers pressure-weld the electric wires to the pressure-welding parts of the contacts in the specified cavities, with the cavity side walls or the contact pressure-welding part side walls in a supported state. Accordingly, the method of the present invention is advantageous in that the opening of the pressure-welding parts of the contacts can be securely prevented without forming cutouts in the partition walls between the cavities of the connector housing.

We claim:

1. A pressure welding apparatus for pressure welding a wire to a contact that is disposed in one cavity of a housing having a plurality of side-by-side cavities that are separated by partition walls, the apparatus comprising:

a pressing die assembly having a stuffer that is associated with said one cavity, and a pair of pins disposed on respective opposite sides of said stuffer, said pins being resiliently biased to protrude beyond an end of said stuffer, and said pins being arranged to enter respective said cavities that are adjacent to said one cavity and to support said partition walls that are between said one cavity and said adjacent cavities.

2. The pressure welding apparatus of claim 1 wherein each of said pins has a width that is substantially equal to a width of its corresponding said adjacent cavity.

3. The pressure welding apparatus of claim 1 wherein each of said adjacent cavities holds a contact having opposite side walls, and each of said pins has a width that is substantially equal to a width between said opposite side walls.

4. The pressure welding apparatus of claim 1 wherein each of said pins has a cross-sectional shape that is circular.

* * * * *